United States Patent
Blakers et al.

(10) Patent No.: US 10,581,785 B2
(45) Date of Patent: *Mar. 3, 2020

(54) APPARATUS, SYSTEM, AND METHOD OF ELASTICALLY PROCESSING MESSAGE INFORMATION FROM MULTIPLE SOURCES

(71) Applicant: Nasdaq Technology AB, Stockholm (SE)

(72) Inventors: Tristan Blakers, Sydney (AU); Chuin Nee Ooi, Leichhardt (AU); Max Roy Prakoso, Haymarket (AU)

(73) Assignee: Nasdaq Technology AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,106

(22) Filed: Oct. 19, 2018

(65) Prior Publication Data

US 2019/0104099 A1   Apr. 4, 2019

Related U.S. Application Data

(63) Continuation of application No. 14/290,386, filed on May 29, 2014, now Pat. No. 10,110,540.

(60) Provisional application No. 61/829,545, filed on May 31, 2013.

(51) Int. Cl.
| | | |
|---|---|---|
| *G06F 15/16* | (2006.01) | |
| *G06F 3/048* | (2013.01) | |
| *G06Q 40/00* | (2012.01) | |
| *G06Q 40/04* | (2012.01) | |
| *H04L 12/28* | (2006.01) | |
| *H04L 12/58* | (2006.01) | |
| *G06F 3/0481* | (2013.01) | |

(Continued)

(52) U.S. Cl.
CPC ............. *H04L 51/26* (2013.01); *G06Q 40/04* (2013.01); *H04L 51/34* (2013.01); *G06F 3/0481* (2013.01); *G06Q 10/10* (2013.01); *G06Q 40/06* (2013.01); *H04L 12/2854* (2013.01)

(58) Field of Classification Search
None
See application file for complete search history.

(56) References Cited

U.S. PATENT DOCUMENTS

| | | | |
|---|---|---|---|
| 2005/0271071 A1* | 12/2005 | Madhavapeddi | ... H04L 12/2854 370/412 |
| 2008/0114896 A1 | 5/2008 | Holt | |
| 2008/0212517 A1 | 9/2008 | Thesling | |

(Continued)

OTHER PUBLICATIONS

U.S. Appl. No. 14/290,386, filed May 29, 2014, Inventor: Blakers et al.

(Continued)

*Primary Examiner* — Nicholas R Taylor
*Assistant Examiner* — Ho T Shiu
(74) *Attorney, Agent, or Firm* — Nixon & Vanderhye P.C.

(57) ABSTRACT

Elastic message tracking apparatus and methods are provided that opportunistically improve on the latency of a message processing system and increase the accuracy of a consolidated message stream generated from message streams received from multiple message sources. The elastic message tracking apparatus and methods reduce that latency in situations where the actual latency of all the message streams is lower than a predetermined latency value.

23 Claims, 7 Drawing Sheets

(51) Int. Cl.
*G06Q 10/10* (2012.01)
*G06Q 40/06* (2012.01)

(56) References Cited

U.S. PATENT DOCUMENTS

| | | |
|---|---|---|
| 2008/0243675 A1 | 10/2008 | Parsons |
| 2009/0252167 A1 | 10/2009 | Naven |
| 2010/0138360 A1* | 6/2010 | Cutler .................. G06F 3/0481 705/36 R |
| 2010/0318495 A1 | 12/2010 | Yan et al. |
| 2011/0010460 A1 | 1/2011 | Lavoie et al. |
| 2011/0238758 A1* | 9/2011 | Liang .................... G06Q 10/10 709/204 |
| 2012/0124606 A1 | 5/2012 | Tidwell |
| 2012/0271748 A1 | 10/2012 | DiSalvo |
| 2013/0262287 A1* | 10/2013 | Parsons ................. G06Q 40/04 705/37 |
| 2014/0180889 A1 | 6/2014 | Rooney |
| 2014/0249979 A1 | 9/2014 | Wallener et al. |

OTHER PUBLICATIONS

Office Action dated Feb. 22, 2016 in co-pending U.S. Appl. No. 14/290,386, 19 pages.
Final Action dated Sep. 9, 2016 in co-pending U.S. Appl. No. 14/290,386, 22 pages.
Office Action dated Jan. 19, 2017 in co-pending U.S. Appl. No. 14/290,386, 22 pages.
Final Action dated Aug. 25, 2017 in co-pending U.S. Appl. No. 14/290,386, 21 pages.
International Search Report and Written Opinion of the International Searching Authority dated Oct. 7, 2014 in PCT/IB2014/000892, 13 pages.
International Preliminary Report on Patentability dated Dec. 10, 2015 in PCT/IB2014/000892, 9 pages.

* cited by examiner

APPARATUS, SYSTEM, AND METHOD OF ELASTICALLY PROCESSING MESSAGE INFORMATION FROM MULTIPLE SOURCES

PRIORITY APPLICATION

This application is a continuation of U.S. application Ser. No. 14/290,386, filed May 29, 2014, which claims the benefit of U.S. Provisional Application No. 61/829,545, filed on May 31, 2013, the contents of each of which are incorporated herein by reference.

BACKGROUND

The present application relates to the technical field of monitoring systems and in particular to tracking messages from multiple message sources.

One example type of monitoring system includes market surveillance systems. Market surveillance systems typically obtain data from a number of disparate data sources. Typically, incoming data message feeds from those sources are not synchronized relative to each other. In order to build an accurate picture of the sequence of actions leading up to an event of interest, messages on each of the incoming data feeds must be ordered in the correct sequence to produce a consolidated data feed.

Messages can be readily re-sequenced correctly at the end of the day when there is no additional data expected and all the messages for the day have been completely received. But it is more complex to re-sequence the messages for close to real-time processing because it is not certain that all the messages that carry a particular timestamp have been received since there are still incoming messages.

There are a number of issues commonly seen with incoming market data feeds that may have an impact on the complexity of data message sequencing including:

(i) Missing time stamps—some messages may not have time stamps.

(ii) Inconsistent time stamp granularity—some messages may have time stamps with different granularity as compared to others, e.g., order and trade time stamps have microsecond precision, while trade cancellations only have second precision.

(iii) Incorrect chronological order—some data feeds are chronologically sorted and messages can arrive in seemingly random time order. In some cases, some messages may be "late" by minutes.

(iv) Incorrect logical order—messages can arrive out of logical sequence, e.g., a trade message arrives prior to both the order messages that should precede the trade.

(v) Data feed latency—latencies in each data feed may be introduced from various sources such as:

(a) Transmission latencies (from trading engine to processing destination);

(b) Excessive system load, particularly during peak periods;

(c) Data pre-processing or conversion activities, particularly those that involve data re-sequencing.

(d) Interruptions to one or more data feeds that cause the feed(s) to be unavailable while other data feeds may remain available.

Therefore, there is a trade-off between the correctness of the message sequence and message processing latency, i.e., how close to real-time the data message feed is processed.

Some market surveillance systems identify patterns of interest in the trading data by evaluating the transaction stream against business rules. Typically, the rules are event-driven—transaction events (e.g., order entry, order amendment, trade, etc.) are examined in the context of the pre-existing market picture to determine if they are of interest. The incoming transactions must be processed in correct chronological and logical order to ensure that the snapshot of the state of the market as of a particular event is accurate.

For instance, unusual price movements or trade volumes in a security that occur just before a price sensitive news announcement can be indicative of insider trading. The trigger event for an insider trading alert might be the appearance of the news announcement, at which point transactions in the security for a period leading up to the news announcement will be examined for unusual patterns. But if a transaction that occurred before the news announcement is incorrectly sequenced in the data feed such that it appears after the news announcement, it will not generate an alert. In other words, that transaction which should trigger an alert was not present when the alert rules were evaluated at the time the news announcement trigger event occurred.

Market surveillance systems do not "back track" and re-evaluate trigger conditions when out of sequence transactions are received. For example, it is difficult to identify which of the trigger conditions would be affected by the out of sequence transactions. Moreover, it is usually prohibitively computationally expensive to go back and re-evaluate rules every time an out of sequence transaction is received if the data is generally incorrectly chronologically sorted.

It would be advantageous if a market surveillance system could improve determinism and orderly processing of messages in markets that contain multiple data feeds from different data sources. One approach might be to assume that all constituent data feeds are already correctly chronologically sequenced within each data feed. If the upstream data feed is not in chronological order, then an intermediate process could be inserted to ensure that the data feed gets re-sequenced before the monitoring system reads the data feed and interleaves the messages from the different data feeds.

For example, a regularly-produced (e.g., periodic) timing signal (sometimes referred to as a "metronome feed" in non-limiting, example embodiments this application) could be used to introduce a predetermined amount of latency into the processing of messages from the data feeds in order to produce more accurate data message monitoring or tracking. The regularly-produced timing interval period or frequency determines the interval between timing messages (sometimes referred to as "heart beat" messages in example embodiments in the application) in the regularly-produced timing feed. The regularly-produced timing feed might include a feed of incrementing timestamps that lag behind real time by a configurable time period. Message tracking only processes messages up to the metronome time, which delays the feed.

This is illustrated in the example shown in FIG. 1 where messages are read in sequence with a regularly-produced timing feed. The regularly-produced timing lag or delay time period may be configured based on the expected lags in the data feeds used in the market. The tracking accuracy increases with larger lag periods. The longer the upstream processes have to transmit the required messages, the higher the probability that the messages will not end up being read out of sequence.

FIG. 2 shows an example where messages are read out of sequence under lower latency configurations. With a shorter regularly-produced timing lag period, there is an increased risk that a delay on one feed, for whatever reason, will cause messages to be processed out of sequence. Thus, it is not usually advisable to make the configured timing feed lag arbitrary low because an arbitrary low lag period may prevent the surveillance system from detecting patterns related to events and thus to alert surveillance analysts or other monitoring personnel. Therefore, a lag period may be set (configured) in accordance with what is considered to be a justifiable trade-off between correct sequencing (e.g., so as to detect patterns accurately) and maximum processing latency. But as mentioned above, configuring such a lag introduces a fixed processing latency for all data message feeds.

Processing in a market with a timing feed-based approach will be "jerky" because there will be unavoidable pauses and subsequent processing bursts as the monitoring apparatus waits for the next available message on the regularly-produced timing feed, processes all the messages that it is allowed to read, then waits for the next available message on the regularly-produced timing feed. The regularly-produced timing interval period determines the extent of the jerkiness of processing within the market. The regularly-produced timing interval period can also be used to determine the maximum granularity of time movement within the market. But short regularly-produced timing interval periods (e.g., 1 ms) may result in an unnecessarily large load on the storage subsystem due to the number of input output operations consumed by memory disk write operations. In systems where the data to be monitored is streamed without being written to storage memory, a shorter regularly-produced timing interval period may cause problems with network overload.

SUMMARY

Elastic message tracking apparatus and methods are provided that opportunistically improve on the latency of a message processing system and increase the accuracy of a consolidated data message stream generated from data message streams received from multiple data message sources. The elastic data message tracking apparatus and methods reduce that latency in situations where the actual latency of all the data message streams is lower than a predetermined latency value.

Electronic data message processing apparatus includes processing circuitry operatively coupled to data message feed ports that receive data messages from multiple data message sources. Each data message source generates a respective chronological sequence of data messages. One or more data messages received at the multiple message feed ports is received out of its respective chronological sequence. The processing circuitry processes received data messages on the incoming data message feed ports based on a data message processing latency time. The data message processing latency time is selectively adapted to provide a consolidated and chronological sequence for the data messages received from the multiple data message feed ports. A combined data message stream is generated so that the data messages in the combined data message stream are transmitted in the consolidated and chronological sequence to one or more destination ports.

In example embodiments, the processing circuitry detects a state parameter, processes data messages received up and until the state parameter changes as being in chronological sequence, and processing data messages received after the state parameter changes as being out of chronological sequence. The data message processing latency time is adapted based on the detected state.

The data messages in the combined data message stream may be processed using a reference time that is separate from a current real time in the electronic data message processing apparatus. A difference between the reference time and the current real time relates to a current latency in the electronic message processing system. The reference time is modified based on the progress of processed messages.

In an example implementation, the reference time is maintained when a message that is out of chronological message sequence is processed.

In another example implementation, when one of the data message feed ports is determined to be in an inactive state, the data messages in the combined data message stream are processed in chronological order if the one of the data message feed ports is determined to become in active state within a predetermined recovery time period. But if the one of the data message feed ports is determined to become in active state outside of the predetermined recovery time period, then the data messages in the combined data message stream are processed out of chronological order. The advance of the reference time may be halted while that data message feed port remains in the inactive state based on the determination of the inactive data message feed port.

Example embodiments may compare a message time of a next data message currently received at each of the data message feed ports having a current lowest data message time to the reference time. If the data message time is less than the reference time, then processing that data message and read a next data message at that data message feed port. Alternatively, if the data message time is greater than the reference time, then adjusting the reference time to the data message time.

Example embodiments may process the data messages in the combined data message stream to detect one or more predetermined patterns, and in response thereto, to generate one or more corresponding alert data messages.

Example embodiments may process a received, unprocessed data message in the combined data message stream based on the content of previously-processed data messages.

In an example embodiments directed to trading, if some of the data messages relate to transaction parameters from an electronic trading exchange, then one or more orderbooks for the electronic trading exchange based on those transaction parameters. An orderbook may be updated using detected data messages that are out of the consolidated and chronological sequence. Each received data message may include a time stamp, and one or more data messages received out of sequence may be re-sequenced based on the data message time stamp.

In an example implementation, data messages received at the data message feed ports are converted into a normalized data format.

DETAILED DESCRIPTION

Figure 1:
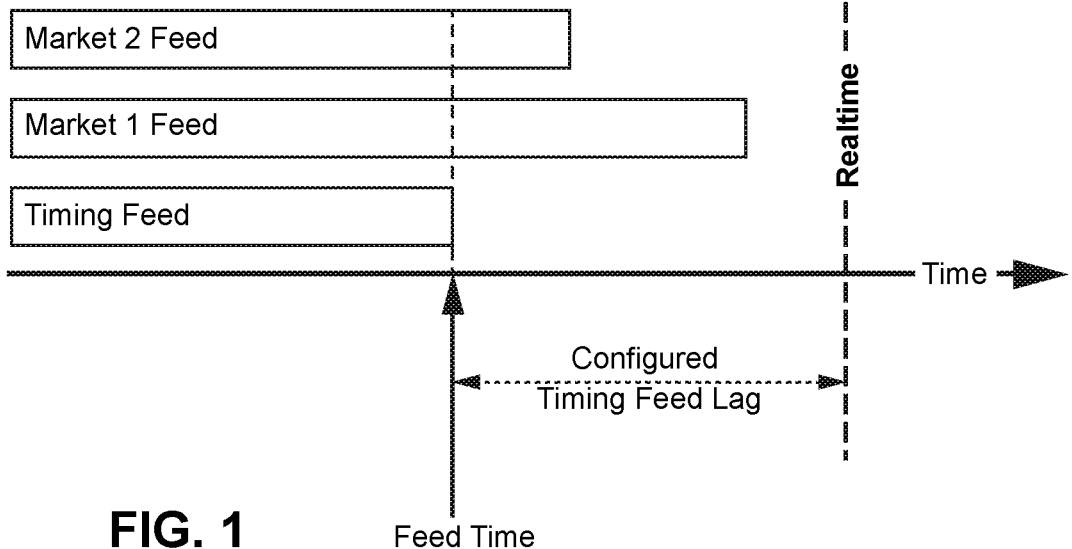
FIG. 1 is an example timing diagram.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions. Although databases may be depicted as tables below, other formats (including relational databases, object-based models and/or distributed databases) may be used to store and manipulate data.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., one or more processors and those input devices and output devices that are appropriate to perform the process.

The term "data message signal" is used herein to encompass any signal that transfers information from one position or region to another in an electrical, electronic, electromagnetic, magnetic, or optical form. Data message signals may be conducted from one position or region to another by electrical or magnetic conductors, optical waveguides, wirelessly (RF, infrared, etc.), and other signal transfer mechanisms. In general, the broad category of data message signals includes both analog and digital signals. An analog signal includes information in the form of a continuously variable physical quantity, such as voltage. A digital signal includes information in the form of discrete values of a physical characteristic, which could also be, for example, voltage.

Unless the context indicates otherwise, the terms "circuitry" and "circuit" are used herein to refer to structures in which one or more electronic components have sufficient electrical connections to operate together or in a related manner. In some instances, an item of circuitry can include more than one circuit. An item of circuitry that includes a processor may sometimes include hardware and software components. Software refers to stored or transmitted data that controls operation of the processor or that is accessed by the processor while operating, and hardware refers to components that store, transmit, and operate on the data. The distinction between software and hardware is not always clear-cut, however, because some components share characteristics of both. A given processor-implemented software component can often be replaced by an equivalent hardware component without significantly changing operation of circuitry, and a given hardware component can similarly be replaced by equivalent processor operations controlled by software.

Circuitry can be described structurally based on its configuration or other characteristics. For example, circuitry that is configured to perform control operations is sometimes referred to as control circuitry and circuitry that is configured to perform processing operations is sometimes referred to as processing circuitry.

In general, interfaces, processors, servers, memories, detectors, user interfaces, and other items may be included in a system in which they are operated automatically or partially automatically. The term system and the term apparatus both refer to a combination of two or more parts or components that can perform an operation together. A system and an apparatus may be characterized by configured operation.

Various forms of computer readable media may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways.

The technology described below may be used in any type of electronic monitoring system. One example application for this technology is a market surveillance system for a trading exchange. While detailed example embodiments are described in the context of a market surveillance system for a trading exchange, the technology is not limited thereto.

Non-limiting example embodiments of a market surveillance system include an elastic tracker apparatus that provides real-time surveillance of market data feeds. By connecting to one or more data feeds, for example a market data feed from a financial instrument or security trading engine, the example market surveillance system provides live market data, real time alerts, historical data tracking, and reporting of historical data.

Figure 3:
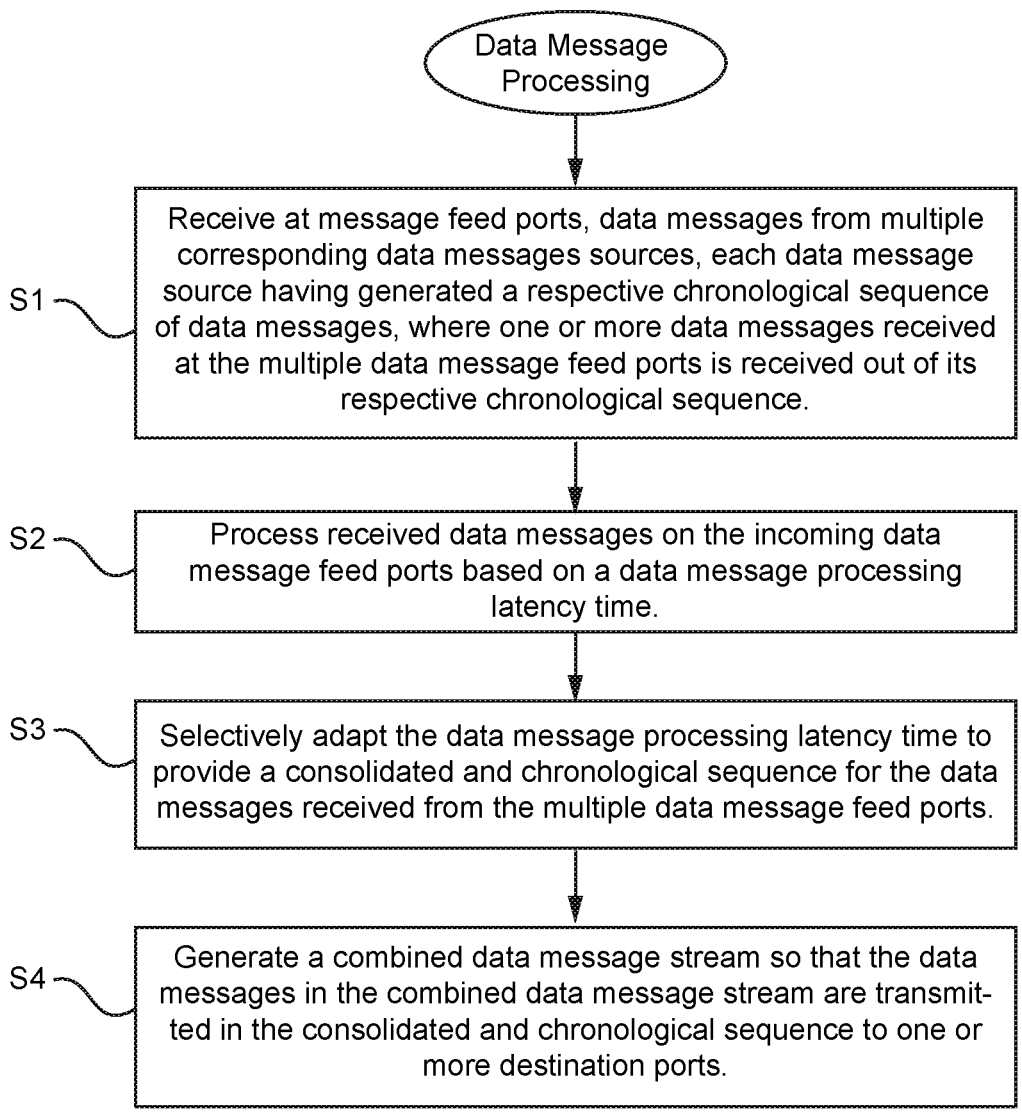
FIG. 3 is a flow chart illustrating non-limiting example procedures for elastically tracking and reporting message information from multiple sources [to be generated to track independent method claim]

FIG. 3 is a flow chart illustrating non-limiting example procedures for elastically tracking data message information from multiple data message sources. A first step S1 includes receiving, at message feed ports, data message signals (or simply data messages) from multiple corresponding message sources. Each message source has generated a chronological sequence of data messages, where one or more data messages received at the message feed ports is received out of its respective chronological message sequence. Processing circuitry processes received data messages on the incoming data message feed ports based on a data message processing latency time (step S2). The data message processing latency time is selectively adapted to provide a consolidated and chronological sequence for the data messages received from the multiple data message feed ports (step S3). A combined data message stream is generated so that the data messages in the combined data message stream are transmitted in the consolidated and chronological sequence to one or more destination ports (step S4).

Figure 4:
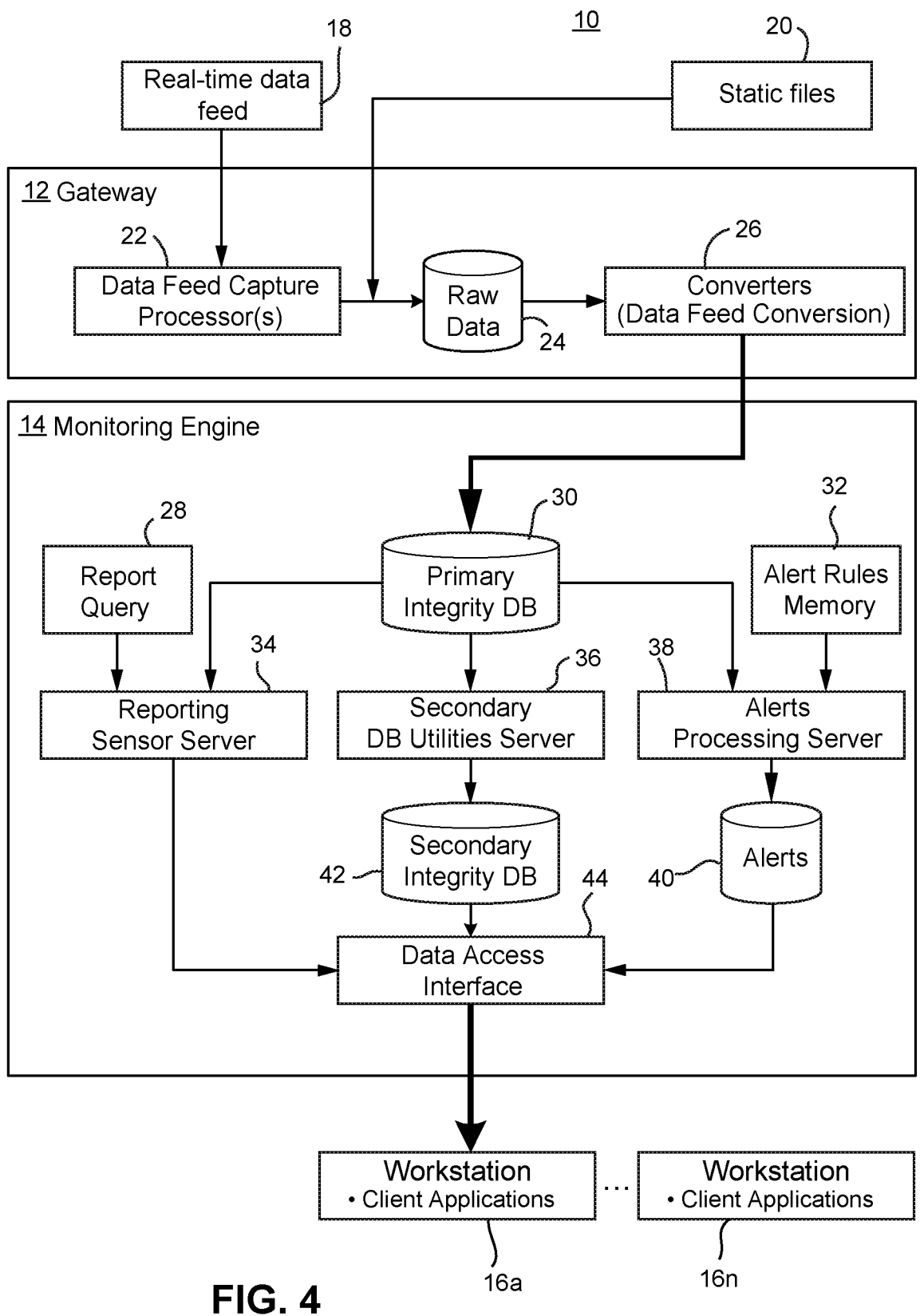
FIG. 4 shows a non-limiting example embodiment of a message processing system that elastically tracks and reports message information from multiple sources.

FIG. 4 shows a non-limiting example embodiment of monitoring system that elastically tracks and reports message information from multiple sources. The monitoring system 10 includes a gateway 12, a monitoring engine 14, and user devices, e.g., workstations 16a . . . 16n. The gateway 12 and monitoring engine 14 may operate, for example, on a Linux server environment, each comprising at least a processor and a memory, providing scalability and robustness. The user devices 16a . . . 16n may include personal computing devices running local Windows applications and client applications. Other data processing and storage environments may be used such as cloud computing, cloud storage, and/or cloud services.

Multiple data feed sources 18 provide data streams to one or more gateway 12 input ports. Data feed capture processor(s) 22 capture the data feeds from the multiple data feed sources 18, e.g. a data feed from a trading engine of a trading exchange system, a data feed from a news aggregator, etc. When the different data feeds are captured, the data messages may be stored in database 24 on a per feed basis in a raw data format. One or more data format converters 26 convert that raw data on a per feed basis into a common data format data and stores the converted data in one or more databases, e.g., 30, 40, 42. The monitoring engine 14 includes a number of computer servers 34, 36, and 38 that utilize one or more databases for report generation and alert detection. The client applications in the work stations 16a . . . 16n allow users, e.g., analysts, to monitor market data and alerts and drill down into advanced reporting and visualization.

In a preferred but example implementation, the gateway 12 is constructed using a modular data processing architecture to allow rapid development and robust data capture from the different data feeds. The monitoring system 10 includes a number of interfaces connecting to external systems and data, including for example: real-time feeds 18, daily flat-files and periodic flat-files (both are referenced as static files 20), and network links. In the above context, a flat-file is a data file that contains records with no structured relationship, it may contain only basic formatting, have a small fixed number of fields, and it may or may not have a set file format. Real-time data feeds are captured live and incrementally as the day progresses. Daily flat-files may be received in a variety of formats and are typically delivered once a day. Periodic flat-files come in a variety of file formats and are updated on a periodic and as-required basis. Network links facilitate access to the monitoring engine computer servers 34, 36, and 38, each of which is implemented using processing circuitry.

In one example implementation, the data feed capture processor(s) 22 store the feed data on disk or other storage medium. The data format converter(s) 26 process the raw feed data and preferably convert the data feed messages into a normalized file format. In some example embodiments, the normalized file format is optimized for the storage of particular types of date, e.g., trading related data. In one example embodiment, the normalized file format data is output to and stored in the Integrity database 30, which may be a high performance, scalable database. An optional secondary database 42 is provided to store files (e.g., RMES, DAYTOT, NEWS) that include optimizations for the client applications and may be the underlying data structures used for the real-time work station/client connections.

The data format converter(s) 26 are also configured to process and, if necessary, re-sequence the data messages from the data feeds in a chronological order before utilization by downstream processes.

The monitoring engine 14 includes an alerts processing server 38 and real-time and end of day servers. The alerts processing server 38 reads the converted files stored in the integrity database 30 to generate and process alerts and may store those alerts in an alerts database 40. Information from a reporting server 34, the primary and secondary databases 30 and 42, and the alerts database is provided to and/or is accessible by the client workstations 16a . . . 16n via the data access interface 44.

Database daemons, which are network programs that typically performs various utility functions, allows the client applications in the workstations 16a . . . 16n to access the integrity database 30. This allows an example client application program suite (e.g., a set of computer program based tools) to provide useful monitoring and surveillance functionality and/or features including for example an alerts dashboard, alert creation, data visualization, market replay, full reporting for alerts, and/or news and trading activity. Additionally control software is preferably provided in the client workstations 16a . . . 16n for initialization and restart to ensure smooth recovery when feeds are halted or links fail.

Preferably, system 10 includes data replication and failsafe capabilities to provide robust data backup and recovery in the event of link or system outage. For example, two physical server rollouts may be provided one as a primary site and the other as a secondary site. In the event of a failure at the primary site, the client workstations may connect to the secondary site and continue to analyze data.

At any point in time, different ones of the converted files stored in the integrity database 30 may be out of time synchronization for one or more of the following example reasons:

1—latencies encountered in transmission of the transaction messages from the trading platform to the listener(s), 2—different latencies for the various input feeds, 3—delays introduced by the converter sequencing logic, and/or 4—latencies encountered due to excessive converter load, particularly during peak periods.

In order to accurately and reliably monitor events, an accurate and reliable picture of the relevant sequence of actions must be established. To establish an accurate picture of the sequence of actions leading up to an event of interest, messages on each of the incoming data feeds must be interleaved and processed (e.g., tracked) in the correct chronological sequence to produce a combined data feed. The term chronological sequence encompasses both time and logical sequence. This is handled by one or more tracking processors.

Figure 5:
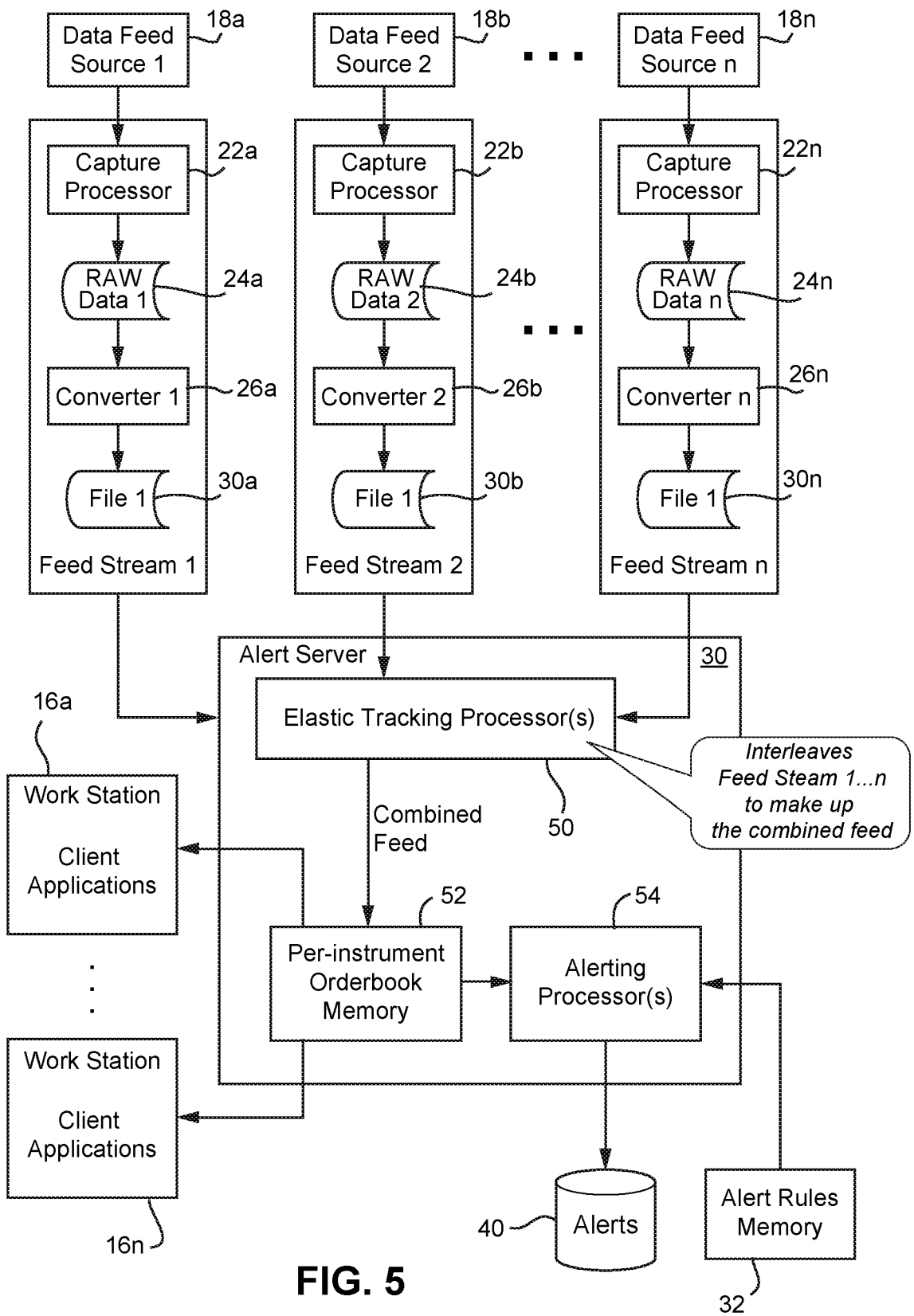
FIG. 5 is an example data feed state activity diagram.

One example embodiment is shown in the monitoring system illustrated in FIG. 5. The capture processors 22 a, b, . . . , n are responsible for capturing real-time data from a data feed, e.g., a trading feed as well as any other type of data feed. Each capture processor 22 a, b, . . . , n creates a raw data file when it successfully connects to a data feed. In an example trading application, this occurs regardless of whether it is a trading or non-trading day. Messages from the feed are appended to the raw data file for the current date as they arrive. Each capture processor 22 *a, b, . . . , n* is started and stopped according to a pre-defined schedule and can be manually controlled in order to mitigate failure scenarios and time changes of schedules that are not pre-planned. As explained above, each data format converter 26 *a, b, . . . , n* re-sequences the data messages for a data feed according to the timestamp in the message should any be received out of sequence/order.

Once data has been correctly sequenced within each formatted file, those files must be processed (tracked) together in time order to produce a consolidated and chronological sequence of the combine data message stream, e.g., a "picture" of sorts of the market in a market surveillance system application for a trading exchange. The alerts processing server 38 includes one or more elastic tracking processors 50 that interleaves feed streams 1, 2, . . . , n from files 30*a*, 30*b*, . . . , 30*n* provided by data format converters 26*a*, 26*b*, . . . , 26*n* to generate a combined data message stream. The combined data message stream is provided in this non-limiting trading example to orderbook memory 52, in which different orderbooks are maintained for trading different financial instruments. By processing the data messages of the combined data feed, the elastic tracking processor(s) 50 may be used to monitor each action and transaction, e.g., on a market. The elastic tracking processor(s) 50 may also maintain the order books for each instrument traded on a tracked market and update the order books as soon as there are messages to process available on the combined data feed.

The combined data message feed is also used to detect various pre-configured patterns, for example different patterns of interesting/suspicions nature. The combined data message stream is provided to one or more alert processors 54 that analyze the combined data message stream in accordance with alert rules stored in alert rules memory 32. If the alert processor(s) 54 detect one or more patterns in the combined data message stream, a corresponding alert message may be generated 40 and output to clients 16*a* . . . 16*n* via an external interface 44. The external interface may transmitting data messages comprising the alert to a client by unicast or transmitted to several clients by means of multicast or broadcast.

In one example embodiment, the elastic tracking processor(s) 50 handle out of sequence transactions that are received by entering the transaction into its corresponding order book and processing as usually done in a trading exchange system.

The elastic tracking processor(s) 50 provide an elasticity that solves the challenge of close to real-time merging of data from multiple data feeds, e.g., financial market data feeds, into a combined data message stream in correct is both chronological and logical sequence. One advantageous feature of the elastic tracking processor(s) 50 is the capability to adapt and respond to adverse data feed conditions. For example, processing latency of the elastic tracking processor(s) 50 is maintained at an optimal operating point in view of a slowest data feed. Under optimal circumstances, the elastic tracking processor(s) 50 process messages as quickly as possible. If one or more data feeds become unavailable, the elastic tracking processor(s) 50 introduce processing latency progressively to ensure that the composite feed remains correctly sequenced. The elastic tracking processor(s) 50 remove the introduced latency when the data feed recovers. This is one example of the elastic nature of the tracking processor(s) 50.

Figure 2:
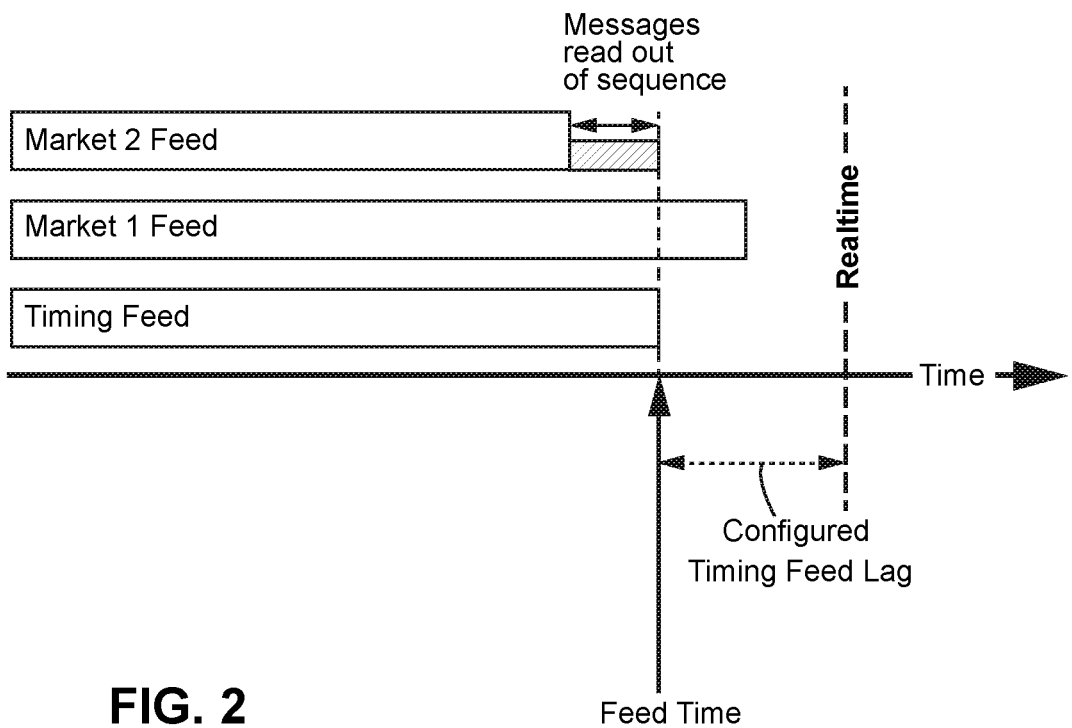
FIG. 2 is another example timing diagram.

The elastic tracking processor(s) 50 maintain the correct chronological sequencing of the combined data message stream unless a data feed outage period exceeds the maximum period that real time processing is allowed to be halted. It may be helpful to review FIGS. 1 and 2 at this point. Feed outage tolerances can be configured on a per feed basis, reflecting the reality that some data feeds are more important than others. For example, there may be no point in continuing to process other data feeds if the data feed containing orders and trades for the primary market is unavailable or late.

The elastic tracking processor(s) 50 builds up an amalgamated or comprehensive picture of the market being monitored in this example (or other multi-input situations in other applications) by reading messages from all the incoming data feeds and processing them in the correct sequence. The elastic tracking processor(s) 50 perform the following tasks, collectively referred to as "tracking" market activity in the market surveillance system example. First, the elastic tracking processor(s) 50 read messages from the data feed(s), determine the next appropriate message to process from the list of available message(s), and process the incoming message in the context of previous transactions, e.g., in the trading exchange example, update the state of the order book(s) for the market as a consequence of the current transaction The alert processor(s) 54 maintains a current time in the market based on a timestamp of a current transaction is being tracked or monitored. This current time is referred to as the "market time." Market time can be different from the current system time, particularly if alert rules are being run on historic data, e.g., data that is not real time. Market time may be different than the timestamp of the current transaction, e.g., a case when the current transaction is chronologically out of sequence. Market time may run faster or slower than the actual elapsed system time. The speed at which market time advances depends on the message delivery rate from the incoming data feeds and the availability of system resources to process those messages.

Alert rules stored in memory 32, e.g., implemented by the alert processor(s) 54, may trigger at particular times of the day or at given intervals. These rules are evaluated in the context of market time. For instance, "at 13:00" might mean that that rule should be evaluated when the market time gets to 13:00. Actual system time may not be 13:00. As another example, "every 10 minutes" might mean that the rule should be evaluated whenever 10 minutes have elapsed in market time. Actual system time may have changed by more or less than 10 minutes.

The elastic tracking processor(s) 50 assumes that time only moves forward. If the incoming messages are out of chronological sequence, tracking processor(s) 50 does not back track and move backwards in time when processing the out of sequence messages. Out of sequence messages are still used to update the order book(s) 52, but the market time is not updated to move "backwards." This means that if the out of sequence messages include trigger conditions, they will be evaluated in the context of the current market time, not the timestamp of the out of sequence message. It also means that trigger conditions from other messages and feeds that exist at the time of the out of sequence message will not be re-evaluated in the context of the additional data. This can result in non-deterministic real-time alerting behavior. Different, "missing," or additional alerts could be produced if the alert rules are re-executed by the alert processor(s) 54 over the same data set at a later point in time where all the messages are available to be read in correct time sequence.

The tracking processor(s) 50 can handle conditions where a data feed becomes temporarily unavailable and subsequently recovers. The "feed recovery window" is the period that is allowed to elapse where processing is temporarily halted while "waiting" for the affected data feed(s) to recover. If the affected data feed(s) recover within the window, processing continues with the messages sequenced correctly (as though the temporarily unavailability had not occurred). If the affected data feed(s) fail to recover within this time period, processing continues on other available data feed(s). If and when the affected feed(s) recover, the messages will be processed out of sequence. The "feed recovery window" is referred to as the feed-idle-timeout, and can be configured differently on each incoming data feed.

Figure 6:
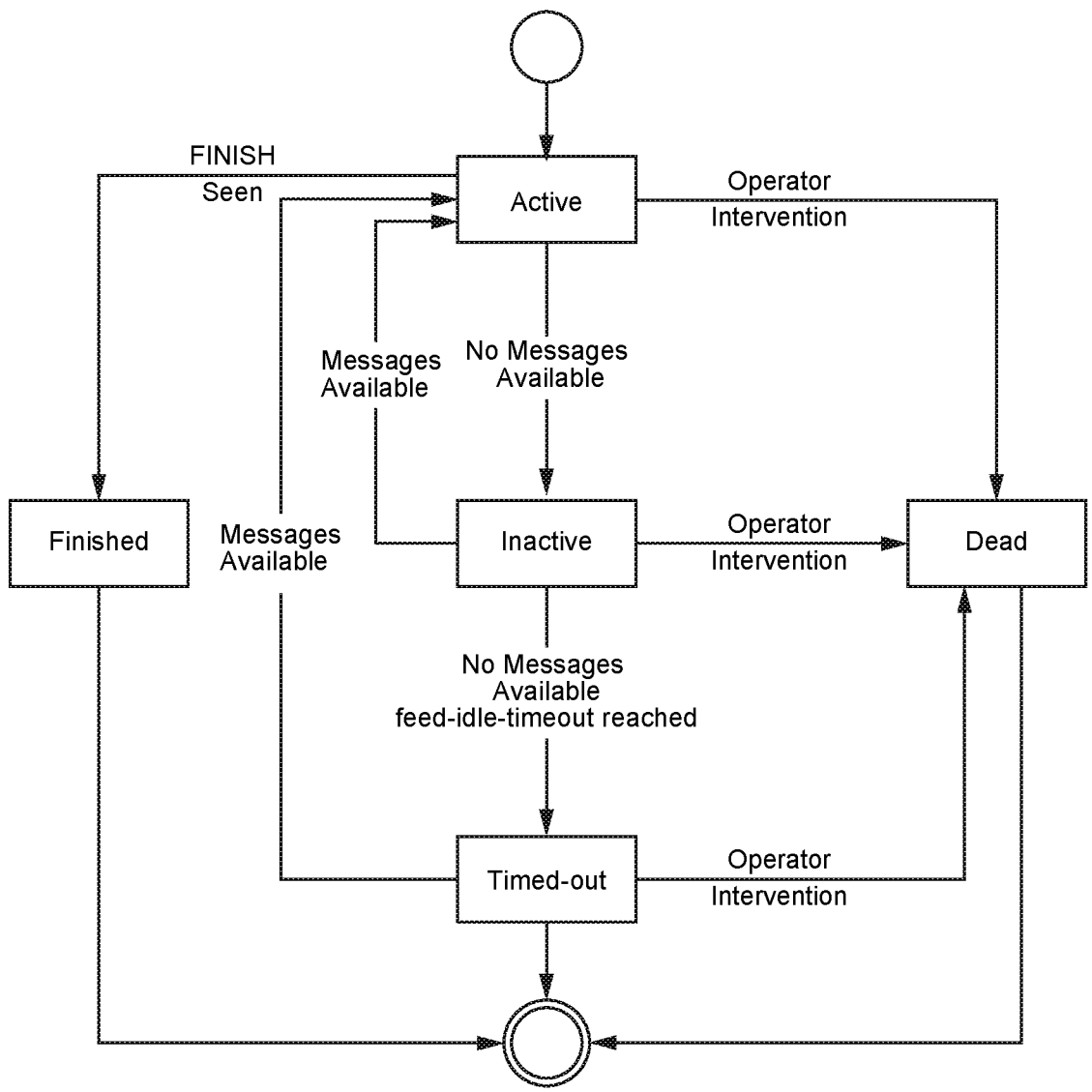
FIG. 6 is a diagram showing a tracking example at maximum latency.

As shown in the example computer flow diagram in FIG. 6, a data feed can be in one of the following states:

| State | Description |
| --- | --- |
| Active | Messages are available |
| Inactive | No messages are available and feed-idle-timeout has not been reached yet. If a feed transitions from inactive to active, all messages from this feed will continue to be processed in the correct sequence. |
| Timed-out | No messages are available even after feed-idle-timeout has been reached. If a feed transitions from timed-out to active, messages from this feed may be processed out of sequence. |
| Dead | Manual operator marks as dead. From the point that it is marked as dead, it ceases to exist. All pending messages on this feed are dropped and it ceases to be polled for new messages. |
| Finished | End of feed marker (if available) is seen on the data feed. No further messages will be read from this feed. |

An inactive feed blocks market time from advancing. If one or more feeds are inactive, then the entire market is blocked at the prevailing market time. Messages are processed if and only if message time is less than market time until all inactive feeds transition to another state. Messages cannot be processed past the current market time because up until feed-idle-timeout is reached, messages can be expected to continue where they previously left off and these messages must be processed in order.

In a preferred but example implementation, messages are read and processed one at a time. Each data feed is received as an input stream that maintains a state based on the following: (1) whether a next message is available, (2) a timestamp of the next available message on the feed (if a message is available), and (3) where it is up to in the feed (byte or message n). In this example implementation, the state is maintained as a read-ahead buffer of a single message. In the absence of messages, time preferably (though not necessarily) advances in increments of a smallest time resolution available.

The following is an example list of configuration parameters that may be used. The references to system time accounts for time zone differences between the operating system and the market.

Configuration Parameters

| Configuration Parameter | Scope | Description |
| --- | --- | --- |
| feed-idle-timeout | Per-feed | Timeout between messages before this feed is considered dead and processing continues without it. |
| feed-latency | Per-feed | Maximum amount of time that this feed is expected/allowed to lag behind "real-time". |
| feed-precedence | Per-feed | If two feeds have messages with the same time stamp, the feed with the lower feed-precedence parameter is used. Here, the feed with lowest feed-precedence parameter represents the feed with highest precedence. I.e. the message of the feed with the highest precedence is selected. |
| feed-poll-freq | Per-feed | How often the feed is re-polled for messages. The feed poll is independent of whether we choose to process messages from the queue or not. It ensures that any new message that appears on a feed will be seen. |
| market-timezone | Per-market | Time zone for the market. The time zone for the market may be different to the time zone on the server. There may be multiple markets on the same server. This may be changed to a per-feed configuration parameter. |

The following is an example set of procedures that may be implemented by the elastic tracking processor(s) 50 in performing example elastic tracking operations. The tracking processor(s) 50 use system time to calculate how much time has elapsed within a feed recovery window.

1. Assume a zero start state, i.e., there are no messages in the read buffer. Read the first message from the monitored data feeds. Feeds that do not have available messages are polled at <feed-poll-freq> for new messages in the background.

2. Next Message Loop if all data feeds have a message available:
   a. If a feed that previously did not have a message now has a message available, stop the timer for that feed.
   b. Process the message with the lowest message time (t). If 2 or more feeds have the same message time, the message from the lowest <feed-precedence> is used.
   c. Read the next message off this feed into the buffer.
   d. If (message time (t)>market time) then market time moves to t.

3. Next Message Loop if one or more feeds do not have available messages:
   a. If a feed that previously did not have a message now has a message available, stop the timer for that feed.
   b. Get the lowest message time (t) (from the next message on each of the feeds that have available messages). If 2 or more feeds have the same message time, the message from the highest precedence feed is used.
   c. If (message time (t)≤market time), then process this message and read the next message off this feed into the buffer.
   d. If (message time (t)>market time), then this implies that all messages are read where message time≤market time. The feed idle timeout is relative to the time that the last message was processed from a feed (message process time). However, whether to process the next message or not is relative to message time. For each feed that does not have available messages:
   i. Start a timer from 0:0:0.000. This timer must start at 0 because feed-idle-timeout is always zero based and is reached from this timer. Record market-time@timer-start@feed.
   ii. Calculate the latest allowable time to process per feed (process-time@feed):

```
if ( timer < <feed-idle-timeout> )
{
    process-time@feed = market-time@timer-start@feed
}
else
{
    process-time@feed = system-time – <feed-latency>
}
```

Up until <feed-idle-timeout>, it can be expected that messages to continue where they previously left off, so do not process past the current market time. After <feed-idle-timeout> is hit, messages will lag actual-time by <feed-latency>. System-time is used as the approximation for actual-time. The latest allowable time to process (process-time) is the smallest number of all per-feed process times. process-time=MINIMUM(all process-time@feed).
iii. If message-time (t)>=process-time:
1. Process this message and read the next message off this feed into the buffer.
2. If (t>market time) then market time moves to t.
iv. Else (i.e. message-time (t)<process-time) wait MINIMUM(poll-freq) and then check again.

Figure 7:
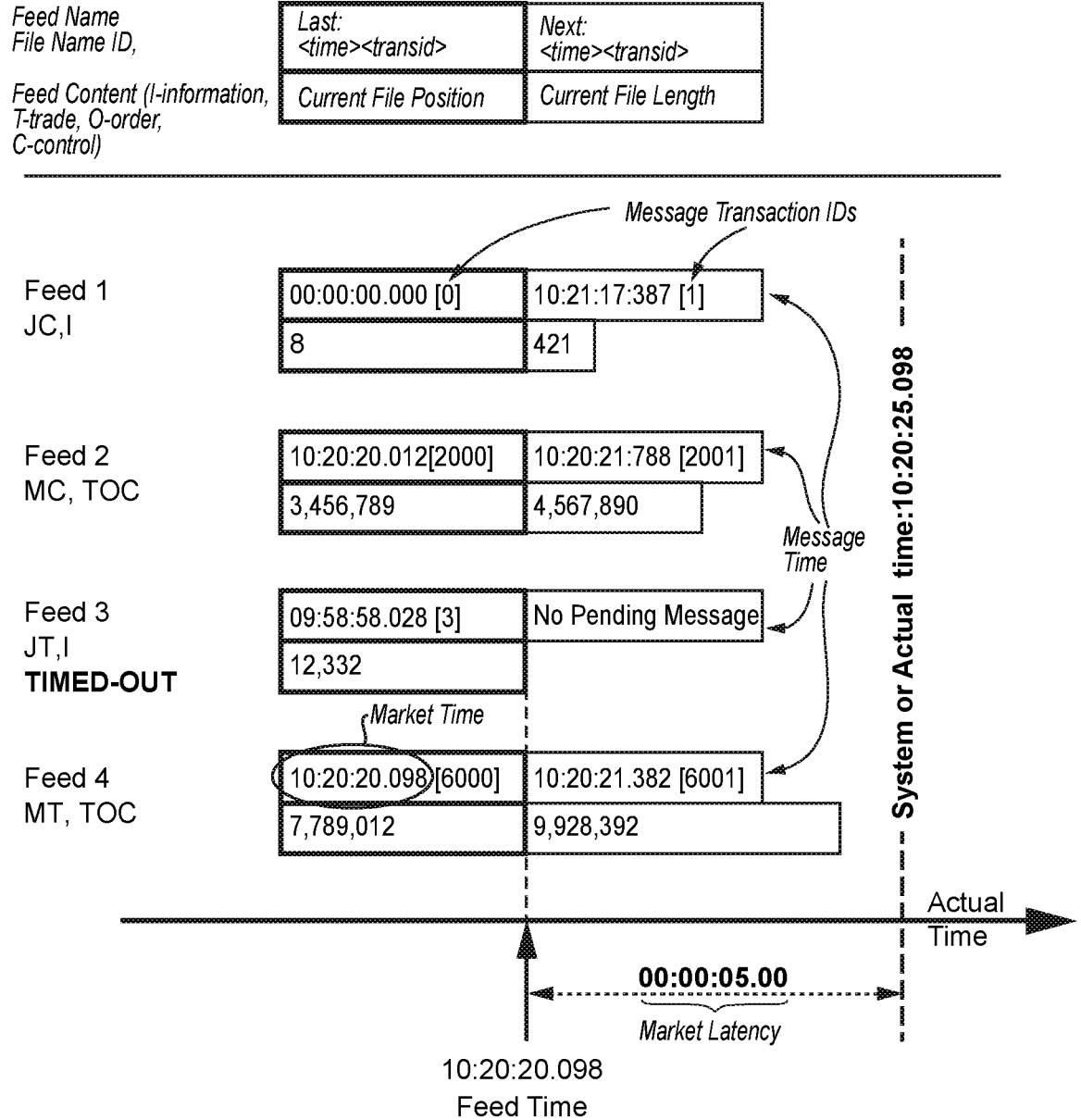
FIG. 7 is an example elastic tracking processor visualization at a maximum latency.

FIG. 7 is an example elastic tracking processor visualization at a maximum latency. There are four feeds shown 1-4, each having a file name identifier, and an indicator of feed content, e.g., I-information, T-trade, O-order, and C-control. For each feed, the Last message consumed on the feed is shown on the left of the feed time, and the Next message waiting to be consumed on that feed is shown to the right of the feed time. For Feed 3, there is no pending message to be consumed. For each feed, there is a "message time" such as message times 0:00:00.000 and 10:21:17.387 for Feed 1 with 8 and 421 being the position of the message in the file, i.e., file offset. The bracketed number following its respective message time, e.g., [0] and [1] for Feed 1, is the message transaction id, which is a number identifying the message. The "market time" is 10:20:20.098 as that is the latest message time (from a reliable feed). The "actual time" is 10:20:25.098 and is recorded on the horizontal axis. The "market latency" is 0:00:05.00. A "tracking wait time" is 0:00:05.00, which is the same as market latency when there is a pending message. Feed idle time is not shown but is a value configured in the tracker configuration file.

Another elastic tracking example embodiment will now be described. An alternate next message loop is used if one or more feed(s) are inactive or timed-out, which may increase efficiency in some ways. The data feed states are maintained as follows. First, when a feed transitions from active to inactive: Start a timer from 0:0:0.000. This timer must start at 0 because feed-idle-timeout is always zero based and is reached from this timer. If this timer reaches feed-idle-timeout, the feed transitions from inactive to timed-out. Second, when a feed transitions from inactive to timed-out: Stop the timer—it is not required any more. If a feed that previously did not have a message now has a message available, feed transitions back to active.

Next message loop if one or more feed(s) are in state inactive or timed-out:
1. Get the lowest message time (t) (from the next message on each of the feeds that have available messages). If 2 or more feeds have the same message time, the message from the highest precedence feed is used.
2. If (message time (t)<=market time) then process this message and read the next message off this feed into the buffer.
3. If (message time (t)>market time): Implies that we have read all messages where message time<=market time.

```
if (one or more feeds is in state "inactive")
{
    wait {{minimum(feed-poll-freq)}}
}
else
{
    // implies that all feeds without a message is now state "timed-out"
    if ( message time < system-time – maximum(<feed-latency> of all timed-out feeds) )
    {
        process-message
    }
    else
    {
        wait minimum(feed-poll-freq)
    }
}
``` a. Up until <feed-idle-timeout> messages are expected to continue where they previously left off, so processing does not continue past the current market time. All feeds block at this point in time.
b. After <feed-idle-timeout> is hit, messages will lag actual-time by <feed-latency>. Use system-time as the approximation for actual-time.
The per-feed maximum latency (instead of a global maximum latency) reduces overall latency in the case where the feed(s) with missing messages are configured with lower latencies than the feeds with a constant flow of messages. Consider the following situation:
 Feed A: Lots of messages (i.e. messages always available) with a large lag (e.g. due to converter inefficiencies)
 Feed B: Very few messages with a small lag
If all feeds have a message, then tracker latency=slowest feed latency. If one or more feeds do not have a message, then tracker latency increases, up to the point where it reaches maximum (max(feed-idle-timeout), max(feed-latency)). When feed-idle-timeout is reached, tracker time is advanced relative to system time. If feed-idle-timeout is reached on all feeds with missing messages, tracker time will lag behind system time by max (feed-latency on missing feeds).

Another elastic tracking embodiment with less dependence on system time is now described.
1. Assume a zero start state, i.e., no messages at all in the read buffer. Read the first message from all feeds so that we know what that is available. Feeds that do not have available messages are polled at <feed-poll-freq> for new messages in the background.
2. Next Message Loop if all feeds have a message available:
   a. If a feed that previously did not have a message now has a message available, stop the timer for that feed.
   b. Process the message with the lowest message time (t). If 2 or more feeds have the same message time, the message from the lowest <feed-precedence> is used.
   c. Read the next message off this feed into the buffer.
   d. If (message time (t)>market time) then market time moves to t.
3. Next Message Loop if one or more feeds do not have available messages:
   a. If a feed that previously did not have a message now has a message available, stop the timer for that feed.
   b. Get the lowest message time (t) from (the next message on each of the feeds that have available messages). If 2 or more feeds have the same message time, the message from the highest precedence feed is used.

c. If (message time (t)<=market time) then process this message and read the next message off this feed into the buffer.
d. If (message time (t)>market time) This implies that we have read all messages where message time<=market time. The timer is relative to the time that the last message was processed from a feed (messsage process time). However, whether we choose to process the next message or not is relative to message time.)
For each feed that does not have available messages:
  (I) Start a timer from 0:0:0.000. This timer must start at 0 because feed-idle-timeout is always zero based and is reached from this timer.
  1. Record market-time@timer-start@feed. process-time@feed is calculated relative to this value. This value is not reset until the timer is stopped.
  2. Record system-time@timer-start@feed. This value is only used to calculate the delta timer.
  (II) Calculate the latest allowable time to process per feed (process-time@feed):

```
if ( timer < <feed-idle-timeout> )
{
    process-time@feed = market-time@timer-start@feed
}
else if ( timer > <feed-latency> - latency-fudge )
{
    process-time@feed = market-time@timer-start@feed
}
else
{
   process-time@feed = market-time@timer-start@feed + timer + latency-fudge - <feed-latency>
}
```

Up until <feed-idle-timeout> we can expect messages to continue where they previously left off, so do not process past the current market time.

After <feed-idle-timeout> is hit, messages should lag actual-time by <feed-latency>. Since there is not direct access to actual-time, a good approximation for actual-time is (market-time@timer-start@feed+timer). With a read-ahead buffer, actual-time could be determined by the latest message that has been flushed to the feed.

latency-fudge is used to compensate for latencies introduced by previous waits in the feed. market-time@timer-start@feed may already lag actual-time. If market-time has moved by less than timer-time, then we know that the feed is already lagging. latency-fudge=maximum(dt−dm, 0)

```
delta-market-time (dm) = market-time − market-time\@preceding-timer-start@(any feed)
delta-timer (dt) = system-time − system-time\@preceding-timer-start@(any feed)
if ( dt > dm )
{
    latency-fudge = dt − dm
}
else
{
    latency-fudge = 0
}
```

The latest allowable time to process (process-time) is the smallest number of all per-feed process times. process-time=MINIMUM(all process-time@feed)

If message-time (t)>=process-time:
  3. Process this message and read the next message off this feed into the buffer.
  4. If (t>market time) then market time moves to t.
    Else (i.e. message-time (t)<process-time) wait MINIMUM(poll-freq) and then check again.

The maximum latency of this example embodiment is:

$$\text{max latency}=\max(\text{feed idle of missing feeds})+\max(\text{latency of missing feeds})+\text{latency@timer start}$$

After feed idle has passed, max latency=max(latency of missing feeds)+latency @ timer start. The first time the timer is started, we cannot establish how far behind real-time the feed is without referencing the actual system time.

System time is used as a synonym for the reference time. Reference time is the current time used by all shared components. Simplistically, this is the current time as the world knows it. However, the system time for different data feed sources are sometimes not synchronized. The timestamp on each data feed message may well be correct in regards to the system time of each data feed source, but different system time for different sources may introduce synchronization errors as a first data feed message received from a first source that have a timestamp equaling a second data feed message received from a second data feed source may not relate to the same actual time.

In some example embodiments, in order to synchronize shared components, a "reference time" is broadcast to the shared components. In some example embodiments, the NTP (Network Time Protocol) is used to synchronize all system clocks for production use (preferably to the same upstream server). This would keep system time the same for all servers.

There are several advantages to receiving a reference time from an external source. For example, for test purposes, it is useful to be able to provide a different source of reference time to simulate certain conditions. Reference time could move faster or slower than actual time for test purposes.

To split the task of sequencing the different data feed messages up into more manageable chunks, the elastic tracker may operate on the assumption that all input data feeds are already correctly sequenced. But this assumption may not always be the case. Therefore, in some example embodiments, the elastic tracker re-sequences the incoming data feeds in order to minimize the chance that data feed messages are processed out of order. Re-sequencing of the incoming data feeds may be done by, for each data feed, storing incoming data feed messages in a read ahead buffer and reordering the sequence in the read ahead buffer according to the timestamp in each message.

| Term | Meaning |
| --- | --- |
| ALICE | Alerting rules language used in the above example embodiments. However, any alert rules language may be used. |
| FAV | Normalized common data feed format. |
| Actual time | Time as the rest of the world knows it. |
| Message time | Timestamp on a FAV message. Time as the trading engine knows it. "Message time" is usually not equal to "flush time". |
| Message flush time | System time that a FAV message is written to disk. |

-continued

| Term | Meaning |
|---|---|
| Market time | Time up to which FAV messages in the constituent feeds are processed. Displayed in the system application clock, current system time. In feeds where there are multiple messages with the same time stamp, market time changes when the first message with a new time stamp is processed. |
| Feed idle time | Duration between two consecutive messages in a data feed. Feed idle time at msg n = msg[n + 1].flush time − msg[n].flush time |
| Tracker wait time | Duration that the tracker waits before consuming the next message from the available data feeds. The selection of which data feed to consume the next message from can change during this period. The tracker will only wait when some feeds do not have a message, i.e., tracker wait time = 0 if all feeds have a message available. |
| Market latency | How far behind actual time is market time running and is the difference between actual time and market time. |

Figure 8:
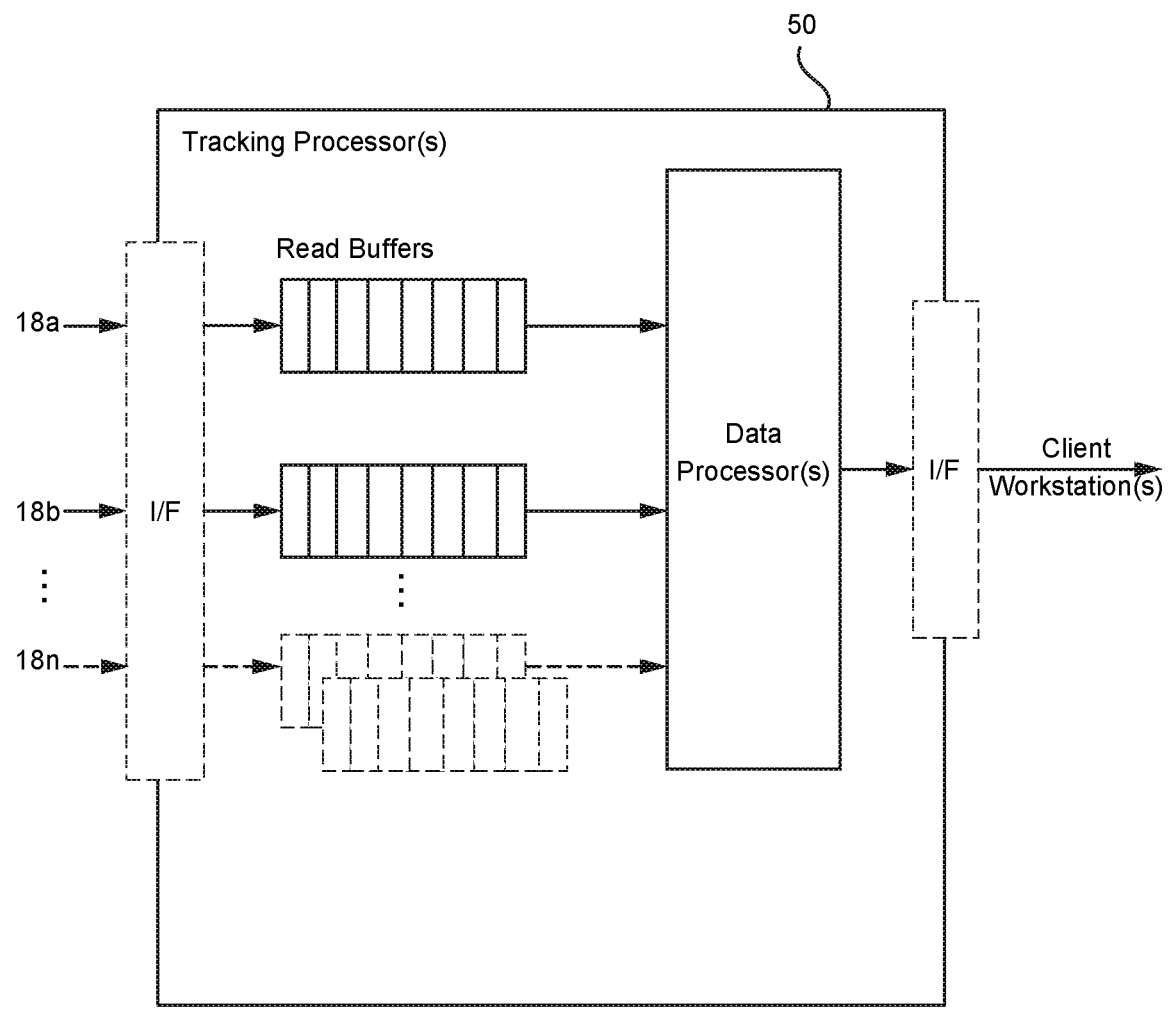
FIG. 8 is a function block diagram of a non-limiting example elastic tracking processor.

FIG. 8 is a function block diagram of a non-limiting example elastic tracking processor in the context of a surveillance system application. A surveillance computer server includes one or more data processors and an interface communicating with one or more external data feed sources. The interface receives electronic data feed messages from the data feed sources. Typically, the electronic data messages are received as a stream of data messages. However, it might well be that a daily or semi-regular batch of data is delivered from some sources. One of the data feed sources may be an electronic market (for example, an automated electronic exchange) to be monitored and the received data feed relates market data from the electronic market. The surveillance computer server further comprises persistent data storage, for example a computer hard drive or a SSD, and one or more computer memories for data storage (e.g., a RAM memory). The data feeds are stored to a persistent storage, to a memory or to both the persistent storage and the memory. The surveillance system may maintain one or more order books in the memory, each order book corresponding to an instrument traded on the electronic market.

As the received data messages of the different data feeds are not sequenced in a chronological and logical order, it is not possible to create a true picture of a market in close to real-time. The data feeds are processed by an elastic market tracker which interleaves the different data feeds to create a consolidated data feed of data messages in a correct sequence according to the timestamps on the different data feed data messages. A read buffer may be maintained for buffering data messages corresponding to each data feed. Examples include but are not limited to FIFO buffers or segmented computer memory. The buffers are queried for available messages when the elastic tracker determines which data message is to be processed and when the data message can be processed. The elastic market tracker tracks or processes the data messages, using for example one of the above-described "elastic" tracker methods, and outputs a stream of processed data messages that is stored to the persistent storage or to a memory. In some embodiments, the interleaved data messages are streamed to one or more client computers via an external interface configured to communicate with client computers. The market tracker updates corresponding order books stored in memory based on the actions related to the data message. The surveillance computer server may include an alert engine for detecting predetermined patterns in the consolidated data feed or detect events in the order books. The alert engine, upon detecting a pattern, generates and transmits an alert to one or more of the client computers via the external interface.

The surveillance computer server in some example embodiments also comprises a request computer engine for handling queries/requests received from the client computers. The request engine gathers information stored within the surveillance computer server and generates and output responses to the client computers.

The flexible tracking technology described in this application has many technical advantages. First, it significantly reduces the amount of time that a tracking processor spends idle waiting for messages, while ensuring that messages on different feeds are processed in correct message time order. This allows for opportunistic reductions in processing latency bounded by the slowest feed in the market. Second, allowable feed latencies are configurable on a per-feed basis. Third, because some feeds are allowed to be processed out of order, there is no need to hold up the rest of the market to wait for messages on these feeds. An example includes news feeds. Fourth, the technology eliminates erratic time/stop-start processing that is a limitation of a metronome-based solution. Fifth, the operational complexity inherent in metronome-based solutions is reduced. If an intra-day restart is required, a metronome-based solution must be restarted in a fixed order, with wait periods in between component restarts to ensure that messages are processed in correct time order. Also, the need for an external component, such as a metronome feed, is replaced with a built-in component.

The tracking processor operates using a precise time and is sensitive to small aberrations in time movements. The tracking processor can advantageously support very small granularity in the incoming data feeds for relative sequencing of messages. Upstream time stamping components (e.g., trading exchange engines) may be deployed on hardware with specialized high precision real time clocks. That precision may be used for relative sequencing, even when the tracking processor is implemented using less accurate hardware.

If the system time zone is different from the market time zone, a network time protocol (NTP) synchronization may be used with specific master clocks. In some example embodiments, the system time may be a parameter input to the system, which allows for the system time to be significantly different in a test system. Simulations of the real-time day may be run at different times of the day. Testing may require the real-time day to be played back faster or slower than normal time.

Where system time is used as an input to the tracking processor, it preferably arrives as a feed input that is available to all dependent components so that they all share common time. In one example implementation, the current system time can be broadcast to all shared components on a system message bus. But there may be limitations with this example approach for very small increments in time due to the elapsed time required to transmit, read, and process the broadcast.

Another advantage is the use of a feed recovery window to accommodate situations where a feed temporarily fails and then recovers, e.g., a data transfer session drop outs, subsequently reconnects, and continues. Feeds that recover within the recovery window can be processed in sequence. Once the recovery window elapses, the overall market latency shrinks to the maximum latency of all configured feeds.

If a feed is dead, then the tracking processor may behave as though this feed does not exist, i.e., the tracking processor drops pending messages for this feed and stops polling this feed for new messages.

Another advantage is that the elastic tracking processor may read messages from the input data feeds one at a time. By assuming that the messages are in strict non-descending order, there is no requirement to buffer feed reads and re-sort them prior to entering this tracker algorithm Buffering can be a resource intensive process that may be better performed on a per-incoming feed basis. This approach splits buffering into more manageable chunks, which reduces the complexity associated with each component and allows the distribution of the processing load across multiple servers, if desired and/or necessary.

Each incoming data feed may contain messages that are in strict non-descending chronological order in the entire feed. Although the tracking processor uses message time to sequence messages between data feeds, the tracking processor preferably does not re-sequence messages within a data feed. But if messages not chronologically sequenced within a data feed are re-sequenced, an intermediate process may be inserted to buffer and re-sequence the messages prior to the tracking processor reading the data feed. Any messages that jump backwards in time in a data feed may be processed out of order. As explained earlier, market time only advances and does not move backwards. However, downstream components should still be prepared for messages with timestamps jumping backwards. If a message arrives that is outside the elasticity bounds of the tracking processor, the timestamp of that particular transaction will be behind market time.

Although the description above contains many specifics, they should not be construed as limiting but as merely providing illustrations of some presently preferred embodiments. Embodiments described herein may be considered as independent embodiments or may be considered in any combination with each other to describe non-limiting examples. Although non-limiting, example embodiments of the technology were described in a web services provider distributed storage service context, the principles of the technology described may also be applied to other distributed processing and storage systems and services. Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. An electronic data message processing apparatus comprising:
    gateway interface circuitry having different data message feed ports comprising at least a first feed port and a second feed port and configured to receive different data messages from multiple different data message sources, each data message source having generated a respective chronological sequence of data messages, where data messages received at multiple ones of the different data message feed ports are received out of chronological sequence; and
    processing circuitry coupled to the gateway interface circuitry and configured to:
        buffer received data messages from all of the different data message feed ports;
        compare a next message time associated with one of the buffered data messages received from the first feed port waiting to be processed to a current feed time of a latest processed data message from the second feed port, wherein the reference time is later than the current feed time;
        when the next message time for the message from the first feed port exceeds the current feed time for the message from the second feed port, (i) set the current feed time to the next message time and (ii) adapt a data message processing latency time, corresponding to a difference between the current feed time for the message from the second feed port and the reference time, to a difference between the next message time for the message from the first feed port and the reference time, wherein the adapted data message processing latency time accounts for the data messages received at all of the different data message feed ports out of chronological sequence and provides a consolidated and chronological sequence for all of the data messages received from the multiple ones of the different data message feed ports; and
        generate within the adapted data message processing latency time a combined data message stream including all of the data messages received at all of the multiple ones of the different data message feed ports so that all of the data messages in the combined data message stream are transmitted in the consolidated and chronological sequence to one or more destination ports.

2. The electronic data message processing apparatus of claim 1, wherein the processing circuitry is further configured to process the data messages in the combined data message stream and to detect data messages that are out of chronological sequence using the reference time.

3. The electronic data message processing apparatus of claim 1, wherein the processing circuitry is further configured to maintain the reference time when a message that is out of chronological message sequence is processed.

4. The electronic data message processing apparatus of claim 1, wherein the one of the buffered data messages waiting to be processed is a next data message currently received at one of the data message feed ports having a current earliest data message time, and wherein if the current earliest data message time is less than the reference time, then the processing circuitry is configured to process that data message and read a next data message at that one data message feed port.

5. The electronic data message processing apparatus of claim 1, wherein when one of the data message feed ports is determined to be in an inactive state, the processing circuitry is configured to (a) process the data messages in the combined data message stream in chronological order if the one of the data message feed ports is determined to change to an active state within a predetermined recovery time period, and (b) process the data messages in the combined data message stream out of chronological order if the one of the data message feed ports is determined to change to an active state outside of the predetermined recovery time period.

6. The electronic data message processing apparatus of claim 5, wherein based on a determination that the one data message feed port is in an inactive state, the processing circuitry is configured to halt adaptation of the data message processing latency time while that data message feed port remains in the inactive state.

7. The electronic data message processing apparatus of claim 1, wherein the processing circuitry is configured to process the data messages in the combined data message stream to detect one or more predetermined patterns, and in response thereto, to generate one or more corresponding alert data messages.

8. The electronic data message processing apparatus of claim 1, wherein the processing circuitry is configured to process a received, unprocessed data message in the combined data message stream based on content of previously-processed data messages.

9. The electronic data message processing apparatus of claim 1, wherein at least some of the data messages relate to transaction parameters from an electronic trading exchange and the processing circuitry is configured to update one or more orderbooks for the electronic trading exchange based on those transaction parameters.

10. The electronic data message processing apparatus of claim 9, wherein the processing circuitry is further configured to update the one or more orderbooks using detected data messages that are out of the consolidated and chronological sequence.

11. The electronic data message processing apparatus of claim 1, wherein the processing circuitry is configured to capture data messages as received at the data message feed ports and convert data in the captured data messages into a normalized data format.

12. The electronic data message processing apparatus of claim 1, wherein each received data message includes a time stamp and the processing circuitry is configured to re-sequence, based on the one or more time stamps, one or more data messages received out of sequence.

13. A method implemented in an electronic data message processing apparatus having processing circuitry operatively coupled to different data message feed ports comprising at least a first feed port and a second feed port, comprising:
  receiving at the different data message feed ports different data messages from multiple different data message sources, each data message source having generated a respective chronological sequence of data messages, where data messages received at multiple ones of the different data message feed ports are received out of chronological sequence;
  buffering received data messages from all of the different data message feed ports;
  comparing, by processing circuitry, a next message time associated with one of the buffered data messages received from the first feed port waiting to be processed to a current feed time of a latest processed data message from the second feed port, wherein the reference time is later than the current feed time;
  when the next message time for the message from the first feed port exceeds the current feed time for the message from the second feed port, the processing circuitry: (i) setting the current feed time to the next message time and (ii) adapting a data message processing latency time, corresponding to a difference between the current feed time for the message from the second feed port and the reference time, to a difference between the next message time for the message from the first feed port and the reference time for the electronic data message processing apparatus, wherein the adapted data message processing latency time accounts for the data messages received at all of the multiple ones of the different data message feed ports out of chronological sequence and provides a consolidated and chronological sequence for all of the data messages received from the multiple ones of the different data message feed ports; and
  generating within the adapted data message processing latency time a combined data message stream including all of the data messages received at all of the multiple ones of the different data message feed ports so that all of the data messages in the combined data message stream are transmitted in the consolidated and chronological sequence to one or more destination ports.

14. The method claim 13, further comprising:
  processing the data messages in the combined data message stream, and
  detecting data messages that are out of chronological sequence using the reference time.

15. The method claim 13, further comprising:
  maintaining the reference time when a message that is out of chronological message sequence is processed.

16. The method claim 13, wherein when one of the data message feed ports is determined to be in an inactive state, the method further comprising:
  (a) processing the data messages in the combined data message stream in chronological order if the one of the data message feed ports is determined to change to an active state within a predetermined recovery time period, and
  (b) processing the data messages in the combined data message stream out of chronological order if the one of the data message feed ports is determined to change to an active state outside of the predetermined recovery time period.

17. The method of claim 16, further comprising:
  halting advance of the reference time while the one of the data message feed ports remains in the inactive state based on a determination that the one of the data message feeds port is in an inactive state.

18. The method of claim 13, further comprising:
  processing the data messages in the combined data message stream to detect one or more predetermined patterns, and in response thereto, to generate one or more corresponding alert data messages.

19. The method of claim 13, wherein each received data message includes a time stamp and the method further comprises:
  re-sequencing, based on one or more time stamps, one or more data messages received out of sequence at each of the data message feed ports.

20. An electronic data message processing apparatus, comprising:
  means, comprising at least a first feed port and a second feed port, for receiving different data messages from multiple different data message sources, each data message source having generated a respective chronological sequence of data messages, where data messages received at multiple ones of the different data message feed ports are received out of chronological sequence;
  means for buffering the different data messages received from the multiple different data message sources;
  means for comparing a next message time associated with one of the buffered data messages received from the first feed port waiting to be processed to a current feed time of a latest processed data message from the second feed port, wherein the reference time is later than the current feed time;

means, when the next message time for the message from the first feed port exceeds the current feed time for the message from the second feed port, for setting the current feed time to the next message time;

means, when the next message time for the message from the first feed port exceeds the current feed time for the message from the second feed port, for adapting a data message processing latency time, corresponding to a difference between the current feed time for the message from the second feed port and the reference time, to a difference between the next message time for the message from the first feed port and the reference time, wherein the adapted data message processing latency time accounts for the data messages received at all of the multiple ones of the different data message feed ports out of chronological sequence and provides a consolidated and chronological sequence for all of the data messages received from the multiple ones of the different data message feed ports; and means for generating within the adapted data message processing latency time a combined data message stream including all of the data messages received at all of the multiple ones of the different data message feed ports so that all of the data messages in the combined data message stream are transmitted in the consolidated and chronological sequence to one or more destination ports.

21. The electronic data message processing apparatus of claim 1, wherein the current feed time is different from a time stamp for a latest processed data message from the second feed port.

22. The method of claim 13, wherein the current feed time is different from a time stamp for a latest processed data message from the second feed port.

23. The electronic data message processing apparatus of claim 20, wherein the current feed time is different from a time stamp for a latest processed data message from the second feed port.

* * * * *

UNITED STATES PATENT AND TRADEMARK OFFICE
CERTIFICATE OF CORRECTION

PATENT NO. : 10,581,785 B2
APPLICATION NO. : 16/165106
DATED : March 3, 2020
INVENTOR(S) : Blakers et al.

Page 1 of 1

It is certified that error appears in the above-identified patent and that said Letters Patent is hereby corrected as shown below:

In the Claims

Column 20, Line 9 (Claim 1), "wherein the reference time" should read --wherein a reference time--

Column 21, Line 53 (Claim 13), "wherein the reference time" should read --wherein a reference time--

Column 22, Line 66 (Claim 20), "wherein the reference time" should read --wherein a reference time--

Signed and Sealed this
Twelfth Day of May, 2020

Andrei Iancu
*Director of the United States Patent and Trademark Office*